(12) United States Patent
Sorrentino et al.

(10) Patent No.: US 7,135,068 B2
(45) Date of Patent: Nov. 14, 2006

(54) METHOD FOR OXIDIZING TREATMENT OF STEEL WORKS SLAG AND RESULTING LD SLAG

(75) Inventors: François Sorrentino, Meyzieu (FR); Guy Chaperon, Paris (FR); Jean-Pierre Bayoux, Lyons (FR)

(73) Assignee: Lafarge, Paris (FR)

( * ) Notice: Subject to any disclaimer, the term of this patent is extended or adjusted under 35 U.S.C. 154(b) by 199 days.

(21) Appl. No.: 10/296,467

(22) PCT Filed: May 22, 2001

(86) PCT No.: PCT/FR01/01585

§ 371 (c)(1), (2), (4) Date: Jun. 10, 2003

(87) PCT Pub. No.: WO01/90019

PCT Pub. Date: Nov. 29, 2001

(65) Prior Publication Data

US 2004/0020411 A1     Feb. 5, 2004

(30) Foreign Application Priority Data

May 24, 2000   (FR) ................... 00 06644

(51) Int. Cl.
*C04B 7/14* (2006.01)
(52) U.S. Cl. .............. 106/789; 106/791; 106/745
(58) Field of Classification Search ............. 106/789, 106/791, 745
See application file for complete search history.

(56) References Cited

U.S. PATENT DOCUMENTS

| | | | |
|---|---|---|---|
| 1,910,676 A * | 5/1933 | Bruhn | |
| 3,684,539 A * | 8/1972 | Bartholomew | |
| 5,421,880 A * | 6/1995 | Young ................. | 106/756 |
| 5,494,515 A * | 2/1996 | Young ................. | 106/756 |
| 5,516,357 A * | 5/1996 | Edlinger et al. ........ | 75/434 |
| 6,491,751 B1 * | 12/2002 | Watson .............. | 106/756 |
| 6,676,747 B1 * | 1/2004 | Edlinger .............. | 106/789 |
| 6,835,244 B1 * | 12/2004 | Oates et al. ........... | 106/789 |
| 2004/0093988 A1 * | 5/2004 | Poupardin et al. ...... | 75/434 |

FOREIGN PATENT DOCUMENTS

| | | | |
|---|---|---|---|
| AT | 407874 | * | 7/2001 |
| BE | 887646 | * | 8/1981 |
| EP | 1354969 | * | 10/2003 |
| FR | 1346312 | * | 11/1963 |
| FR | 1346312 | * | 12/1963 |
| FR | 2541310 | * | 8/1984 |
| FR | 2541310 A1 * | | 8/1984 |
| GB | 1 556 833 | | 11/1979 |
| JP | 50066526 | * | 6/1975 |
| JP | 61048456 | * | 3/1986 |
| WO | WO 2002062720 | * | 8/2002 |

OTHER PUBLICATIONS

"Making basic oxygen steel slag useful", George et al. Lafarge Fondu Int.,☐☐INt. Congr. Chem Cem. (proc) 7th (1980), vol. 2, III/140-III/144.*

"A study of treatment of oxygen steelmaking slag for use in the cement industry" Grosjean et al.☐☐Comm Eur Communities (Rep) EUR (1984), EUR 9236, Energy Conserv. Ind., vol. 3, 256-69.*

"Cement-free concrete mixtures for laying underground shafts" Oschchepkov, Izvestiya Vysshikh Uchebnykh Zavedenii, Gornyi Zhurnal (2002), (4), 105-110.*

\* cited by examiner

*Primary Examiner*—Paul Marcantoni
(74) *Attorney, Agent, or Firm*—Young & Thompson

(57) ABSTRACT

A treatment method includes injecting oxygen into the liquid steel works slag, adding and dissolving in the slag alumina and lime sources, and optionally silica and iron sources and cooling the slag until solidification, the additions being carried out in such amounts and the cooling being performed at such speed that the resulting slag has a mineralogical composition having one of the following constituting element: (a) an amorphous glassy phase; (b) a first group of phases (1) consisting, in weight percentages, of 10–40 CA, 20–50 C2AS, 30–50 C6AF2 and 10–30 C2S; (c) a second group of phases (2) consisting, in weight percentages, of 20–40 C2F, 10–30 C2AS, 20–50 C6AF2 and 10–40 C2S, and (d) a mixture of amorphous glassy phase and of the first or second group of phases. The invention is applicable to hydraulic binders.

17 Claims, No Drawings

METHOD FOR OXIDIZING TREATMENT OF STEEL WORKS SLAG AND RESULTING LD SLAG

CROSS REFERENCE TO RELATED ART

This is the 35 USC 371 national stage of international application PCT/FR01/01585 filed on May 22, 2001, which designated the United States of America.

FIELD OF THE INVENTION

The present invention relates in a general manner to treated LD scoriae having the properties of a hydraulic binding material and a process for obtaining such LD scoriae by treatment of steel works slag.

More particularly, the invention relates to a treatment of steel works slag giving treated LD scoriae, the mineralogical composition of which makes them synthetic materials having enhanced performances when used for construction (granulates for concrete or roads, hydraulic binding materials or binding materials with hydraulic potential).

BACKGROUND OF THE INVENTION

The production of hydraulic products or products with hydraulic potential from raw materials without emission of $CO_2$ encounters difficulties inherent in their unfavourable chemistry and mineralogy for the production of a binding material.

By unfavourable is meant that the product obtained will not be usable on its own or optionally in a mixture with Portland cement because it will not show the resistance required by the standards or because it will generate problems relating to the swelling or destruction of the structures. This is the case for the LD scoriae(scoriae derived from solidified and crushed steel works slag).

The LD scoriae are by-products of the refining of haematite pig iron (smeltings poor in phosphorus) by the process of oxygen insufflation. This is a material rich in iron and lime having a mean mineralogical composition which is located in the set consisting of dicalcium silicates, calcium ferrite and metal oxides and the average chemical composition of the principal compounds of which is the following:

| Compound | % by weight |
|---|---|
| CaO | 50 |
| $SiO_2$ | 13 |
| $Al_2O_3$ | 3 |
| MgO | 6 |
| Iron oxides | 28 |
| Free iron | Up to 20 |
| Free CaO | Up to 10 |

The use of the LD scoriae in the form of granulates for concrete or for road construction for the generation of both bituminous upper layers and the foundation layers is limited by the presence of free lime which will create expansions of the road surface or of the concrete.

The transformation of the LD scoriae into a hydraulic binder also arouses much interest.

The patent FR-2.546.530 describes of steel works slag with a view to its use in cement.

The treatment described in this patent consists of adding to the liquid slag at least one compound capable of forming alumina, of supplying the quantity of heat necessary to dissolve the compound in the slag and of subjecting the slag to mixing with oxygen.

The quantity of the compound(s) capable of forming alumina added to the liquid slag is such that the treated slag contains 5 to 25% by weight of alumina.

Although the patent FR-2.546.530 indicates that the slag thus treated can be used as hydraulic binding material, in particularly for the manufacture of cement, this treatment does not make it possible to obtain a hydraulic binding material on its own, capable of replacing Portland cement entirely.

It has now been found that it is possible to treat steel works slag so as to confer on it a mineralogical composition lying in the range of specific mineralogical compositions such that the steel works slag thus treated constitutes a hydraulic binding material on its own, capable of replacing Portland cement entirely.

SUMMARY OF THE INVENTION

The subject of the present invention is therefore a process for the treatment of steel works slag leading to treated steel works slag (LD scoriae) having a specific mineralogical composition as a result of which these treated slags constitute hydraulic binding materials on their own.

The subject of the present invention is also treated LD scoriae having a specific mineralogical composition making them suitable for use as hydraulic binding materials on their own.

The process for the treatment of a steel works slag according to the invention comprises:

the injection into the liquid slag of gaseous oxygen or a mixture of gases containing oxygen gas;

the addition to the liquid slag and the dissolution in this latter of a source of alumina and a source of lime and optionally a source of silica and/or iron;

the cooling of the slag until the latter solidifies, characterised in that the quantities of the source of alumina and of lime, and the optional sources of silica and iron added are such and the rate of cooling is such that the treated and solidified steel works slag has a mineralogical composition having one of the following constitutions:

(a) an amorphous vitreous phase;

(b) a first set of phases (1) constituted, in percentage by weight, of 10–40 CA, 20–50 C2AS, 30–50 C6AF2 and 10–30 C2S;

(c) a second set of phases (2) constituted, in percentage by weight, of 20–40 C2F, 10–30 C2AS, 20–50 C6AF2 and 10–40 C2S; and (d) a mixture of an amorphous vitreous phase and the first or second set of phases.

It will be recalled that according to the standard notation of cement makers:

C=CaO
A=$Al_2O_3$
S=$SiO_2$
F=$Fe_2O_3$
P=$PO_4$

The above phases are not pure compounds but may contain in solid solution impurities such as iron, magnesia (MgO), phosphorus ($P_2O_5$), sulfur, etc.

The treated LD scoriae according to the invention are characterized by the fact that they possess a mineralogical composition such as defined above.

According to an embodiment of the invention, the steel works slag is poured into a vat or ladle, the bath of slag is brought to or maintained at a temperature of 1350° C. to 1550° C., preferably 1350° C. to 1500° C. and usually at 1450° C., subjected in the vat to mixing with oxygen by injection of gaseous oxygen or of a mixture of gases containing gaseous oxygen, such as a mixture of air and oxygen by means of, for example, a torch as described in the patent FR-2.546.530.

As is known, this injection of oxygen not only ensures the mixing of the bath of slag but also the oxidation of the iron and the ferrous oxide (FeO) present in the slag to ferric oxide ($Fe_2O_3$). The injection of oxygen can be done by injecting pure oxygen, air or a mixture of oxygen and air. The injection is done in general so as to obtain a pressure of oxygen or the mixture of gases in equilibrium with the bath of slag of $10^2$ to $5.10^5$ Pa, and preferably $10^5$ to $5.10^5$ Pa.

This injection of oxygen or mixture of gases containing gaseous oxygen generally lasts about 30 minutes.

As a function of the chemical composition of the steel works slag to be treated and the desired ultimate use of the treated slag, during the mixing a defined quantity of a source of alumina, for example pure alumina or bauxite, and a defined quantity of a source of lime, for example lime or limestone (calcium carbonate) and, if necessary, defined quantities of a source of silica, for example silica, or a source of iron, for example hematite, are added to and dissolved in the liquid slag.

The additions may be readily made by means of suitable hoppers.

In general, the dissolution of the additions to the liquid slag does not require the external supply of heat.

In fact, the temperature of molten slag is usually higher than or equal to 1600° C. and, since for the treatment, the temperature of the slag is maintained at 1350–1500° C., it is possible to use the heat differential for the dissolution of at least a part of the additions.

Moreover, as is known, the oxidation of iron metal or ferrous iron oxide (FeO) to ferric oxide ($Fe_2O_3$) is exothermic and the heat released during this reaction can also be used to dissolve the additives.

Preferably, the adducts are introduced into the ladle before molten liquid slag originating from the converter in order to ensure protection of the heat resistant materials of the ladle.

In general, the quantity of the source of alumina added is such that the proportion of alumina in the treated LD scoria obtained is greater than 25% by weight, preferably of the order of 30% by weight or more and the quantity of the source of lime added is such that the proportion of lime in the treated LD scoria obtained is equal to or higher than 40% by weight.

The treated LD scoriae obtained contain 1% by weight or less and preferably do not contain free lime in a detectable quantity.

In view of the compositions of the steel works slag, the quantities of alumina and lime added usually vary from 700 to 1100 kg and from 400 to 800 kg, respectively, for 1000 kg of treated slag.

After dissolution of the additions, the bath of slag is then cooled at a slow or rapid rate of cooling until the slag solidifies, i.e. usually to a temperature of the order of 1100 to 1200° C., suitable for obtaining one of the mineralogical compositions according to the invention.

With slow cooling, the treated slag has a mineralogical composition which may vary from a composition constituted only of the first set of phases (1) or of the second set of phases (2) to a composition constituted of a mixture of a vitreous phase and the first or second set of phases, preferably of the second set of phases. When the mineralogical composition of the treated slag comprises both a vitreous phase and the first or second set of phases, the vitreous phase may represent up to 95% by weight of the slag treated. Preferably, the vitreous phase represents from 5 to 15% by weight and better 5 to 10% by weight of the slag treated.

With rapid cooling, a treated slag constituted entirely of an amorphous vitreous phase is obtained.

In the framework of the present invention, by rapid cooling is meant rates of cooling leading to treated LD scoriae constituted of 100% of a vitreous phase and by slow cooling is meant rates of cooling leading to treated LD scoriae constituted either of a first or second set of phases (1) and (2) or to a mixture of one of these sets with a vitreous phase.

These rates of cooling depend principally on the proportions of $SiO_2$ and $Al_2O_3$ required for the treated LD scoria.

The table below gives as examples the ranges of rates of cooling to be used as a function of the proportions of $SiO_2$ and $Al_2O_3$ required for the treated LD scoria in order to obtain either 100% vitreous phase or 5% by weight or less of vitreous phase.

By using rates of cooling between the two limits, mixtures are obtained containing in variable proportions the sets of phases (1) or (2) and the vitreous phase.

| $SiO_2$ and $Al_2O_3$ contents of the treated LD scoria obtained (% by weight) | | Rate of cooling (° C./second) | % by weight of vitreous phase |
|---|---|---|---|
| $5 \leq SiO_2 \leq 9$ | $35 \leq Al_2O_3 \leq 50$ | $\geq 100$ | 100 |
| | | $\leq 30$ | $\leq 5$ |
| $5 \leq SiO_2 \leq 9$ | $5 \leq Al_2O_3 \leq 35$ | $\geq 50$ | 100 |
| | | $\leq 20$ | $\leq 5$ |
| $9 \leq SiO_2 \leq 30$ | $5 \leq Al_2O_3 \leq 35$ | $\geq 20$ | 100 |
| | | $\leq 10$ | $\leq 5$ |

By using rates of cooling between the rates indicated in the table, mixtures of the set (1) or (2) and the vitreous phase are obtained in variable proportions.

The cooling may be carried out by any suitable means, such as cooling by air or by water, preferably by air.

This cooling is continued until the slag solidifies, classically at a temperature of 1100–1200° C.

The treated LD scoriae obtained can be crushed to form granulates. These granulates can be used alone as hydraulic binding materials or also be mixed with cements to replace in total or in part the sands classically used.

DETAILED DESCRIPTION OF THE INVENTION

The following examples illustrate the present invention.

EXAMPLE 1

A steel works slag with the following characteristics is treated by the process of the invention:

| Chemical composition (% by weight) | | | | | | | | | | | |
|---|---|---|---|---|---|---|---|---|---|---|---|
| $SiO_2$ | $Al_2O_3$ | $Fe_2O_3$ | CaO | MgO | $K_2O$ | $Na_2O$ | $SO_3$ | $TiO_2$ | $Mn_2O_3$ | $P_2O_5$ | S |
| 8.25 | 3.98 | 26.28 | 47.72 | 5.92 | 0.02 | 0.07 | 0.06 | 0.69 | 1.81 | 2.14 | 0.05 |

| Mineralogical composition (% by weight) | | | | |
|---|---|---|---|---|
| $(C_2S/C_3P)ss$ | C2S | (Fe, Mn, Ca, Mg)O | Ferrite | Free CaO |
| 11 | 17 | 20 | 35 | 12 |

(C2S/C3P)SS = solid solution of dicalcium silicate and tricalcium phosphate.

The steel works slag in the liquid state run off into a ladle is ground and oxidised at 1350° C. by insufflation of oxygen by means of a torch. The oxygen flow rate is regulated in order to obtain an oxygen pressure in equilibrium with the bath of slag of $5.10^5$ Pa.

Prior to running off the slag the following additions were introduced into the ladle:

| Additions (in Kg for 1000 kg of slag) | | | | | |
|---|---|---|---|---|---|
| Bauxite | Alumina | Lime | Silica | $Fe_2O_3$ | Limestone |
| 142 | — | — | 70 | 140 | 250 |

After dissolution of the additions, the insufflation of oxygen is stopped and the slag is cooled with air at a rate of 5° C./second until the temperature reaches 1100° C.

The treated LD scoria obtained has the following mineralogical composition:

| Mineralogical composition (% by weight) | | | | |
|---|---|---|---|---|
| C2AS | C6AF2 | C2S | C2F | Vitreous phase |
| 20 | 25 | 20 | 30 | 5 |

The treated scoria obtained is crushed and sieved so as to exhibit the size distribution of a standardised sand. The size distribution is given in the table below:

| Particle size | Standardised sand (%) | Treated scoria (%) |
|---|---|---|
| Between 1 and 2 mm | 33 | 31.1 |
| Between 1 and 600 μm | 21.8 | 26.5 |
| Between 600 and 200 μm | 26 | 24.5 |
| Between 200 and 100 μm | 16.8 | 15.7 |
| Still smaller | 2.3 | 2.1 |

A mortar is prepared under normal conditions with Portland cement (1 part by weight) and a sand constituted half of standardised sand and half of the treated scoria (3 parts by weight). For comparison, a mortar constituted of Portland cement (1 part by weight) and standardised sand (3 parts by weight) was also prepared under standard conditions.

From these mortars, prismatic test pieces 4 cm×4 cm×16 cm are formed by puddling with a water/cement ratio (W/C) of 0.5.

The resistances to deformation and compression are determined on the test pieces. The results obtained are shown below:

| | Resistance to deformation $R_f$ (MPa) | | | | Resistance to compression $R_c$ (MPa) | | | |
|---|---|---|---|---|---|---|---|---|
| | 24 hours | 2 days | 7 days | 28 days | 24 hours | 2 days | 7 days | 28 days |
| Portland cement + standardised sand | 3.3 | 5 | 7.4 | 9.7 | 17.2 | 27.9 | 43.1 | 57.8 |
| Portland cement + 50% standardised sand/50% treated scoria | 4 | 5.3 | 7.7 | 9.9 | 20 | 30.7 | 43.6 | 65.6 |

It can be seen that by using a sand constituted of 50% by weight of standardised sand and 50% by weight of scoria treated according to the invention, a significant gain in resistance is obtained.

Some of the test pieces not having been subjected to the mechanical tests were used for the swelling test ASTM C151 and AAHTO T107. The test proved negative (no swelling).

The above tests were repeated by replacing the Portland cement by Fondu cement (cement based on calcium aluminate). The results below show a significant gain in resistance when the scoria treated according to the invention was used.

| | Resistance to deformation $R_f$ (MPa) | | | | Resistance to compression $R_c$ (MPa) | | | |
|---|---|---|---|---|---|---|---|---|
| | 24 hours | 2 days | 7 days | 28 days | 24 hours | 2 days | 7 days | 28 days |
| Fondu cement + standardised sand | 8.5 | 7.4 | 0.3 | 9.1 | 66.5 | 80.0 | 98 | 113.1 |
| Fondu cement + 50% standardised sand/50% treated scoria | 8 | 8.6 | 9.2 | 10.9 | 88.5 | 90.1 | 105.0 | 129.7 |

The swelling test ASTMC 151 and AASHTO T107 also proved to be negative.

This example shows that the granulate obtained starting from the treated LD scoria of the invention is better than sand, i.e. a granulate usually used in the formulation of mortars.

EXAMPLE 2

Different steel works slags with the following characteristics were treated by the process of the invention:

| Laitier N° | Chemical composition (% by weight) | | | | | | | | | | | |
|---|---|---|---|---|---|---|---|---|---|---|---|---|
| | $SiO_2$ | $Al_2O_3$ | $Fe_2O_3$ | CaO | MgO | $K_2O$ | $Na_2O$ | $SO_3$ | $TiO_2$ | $Mn_2O_3$ | $P_2O_5$ | S |
| 2 | 12.25 | 2.98 | 26.28 | 47.72 | 5.92 | 0.02 | 0.07 | 0.06 | 0.69 | 1.81 | 2.14 | 0.05 |
| 3 | 12.25 | 2.98 | 26.28 | 47.7 | 5.92 | 0.02 | 0.07 | 0.06 | 0.69 | 1.81 | 2.14 | 0.05 |
| 4 | 11.91 | 2.9 | 25.55 | 46.39 | 5.76 | — | — | 0.06 | 0.67 | 1.76 | 2.08 | 0.05 |
| 5 | 11.91 | 2.9 | 25.6 | 46.4 | 5.8 | 0.02 | 0.07 | 0.06 | 0.67 | 1.76 | 2.08 | 0.05 |
| 6 | 12.25 | 2.98 | 26.74 | 47.71 | 4.49 | 0.02 | 0.07 | 0.06 | 0.70 | 0.66 | 0.06 | 0.051 |
| 7 | 11.91 | 3.5 | 25.6 | 47.05 | 4.6 | 0.02 | 0.07 | 0.06 | 0.67 | 1.76 | 2.3 | — |
| 8 | 12.25 | 2.98 | 28.59 | 46.49 | 5.92 | 0.02 | 0.07 | 0.06 | 0.31 | 1.54 | 0.05 | 0.05 |
| 9 | 11.21 | 3.6 | 26.28 | 47.21 | 5.92 | 0.02 | 0.072 | 0.062 | 1 | 1.6 | 1.34 | 0.05 |
| 10 | 8.95 | 2.98 | 26.28 | 49.57 | 4.21 | 0.02 | 0.07 | 0.06 | 0.69 | 1.05 | 1.92 | 0.05 |
| 11 | 13 | 4.5 | 25.6 | 43.4 | 5.76 | 0.02 | 0.07 | 0.06 | 0.07 | 0.6 | 0.6 | 0.05 |
| 12 | 11.52 | 2.57 | 25.3 | 47.72 | 2.36 | 0.02 | 0.072 | 0.06 | 0.62 | 1.81 | 2.57 | 0.05 |

| Slag N° | Mineralogical composition (% by weight) | | | | |
|---|---|---|---|---|---|
| | $(C_2S/C_3P)ss$ | C2S | (Fe, Mn, Ca, Mg)O | Ferrite | Free CaO |
| 2 | 7 | 24 | 15 | 46 | 8 |
| 3 | 7 | 32 | 18 | 33 | 8 |
| 4 | 7 | 31 | 18 | 32 | 4 |
| 5 | 7 | 31 | 10 | 32 | 12 |
| 6 | 0 | 35 | 15 | 39 | 6 |
| 7 | 8 | 31 | 15 | 33 | 6 |
| 8 | 8 | 32 | 9 | 30 | 9 |
| 9 | 4 | 30 | 13 | 39 | 9 |
| 10 | 6 | 23 | 19 | 52 | 2 |
| 11 | 2 | 36 | 16 | 24 | 9 |
| 12 | 9 | 29 | 12 | 35 | 9 |

The steel works slags in the liquid state, run off in a ladle, are mixed and oxidised as in Example 1 under the conditions indicated below.

| Slag N° | Treatment temperature (° C.) | Injected gas | | Duration of treatment (minutes) |
|---|---|---|---|---|
| | | Composition | Pressure (Pa) | |
| 2 | 1450 | Air + oxygen (50%) | $4.10^5$ | 30 |
| 3 | 1450 | Air + oxygen | $5.10^5$ | 30 |
| 4 | 1450 | Air + oxygen | $10^5$ | 35 |
| 5 | 1450 | Air + oxygen (50%) | $5.10^5$ | 30 |
| 6 | 1450 | Air + oxygen (50%) | $5.10^5$ | 30 |
| 7 | 1450 | Air + oxygen (50%) | $5.10^5$ | 30 |
| 8 | 1450 | Air + oxygen (50%) | $5.10^5$ | 30 |
| 9 | 1450 | Air + oxygen | $4.10^5$ | 30 |
| 10 | 1450 | Air + oxygen | $5.10^5$ | 30 |
| 11 | 1450 | Air + oxygen | $5.10^5$ | 30 |
| 12 | 1450 | Air + oxygen | $5.10^5$ | 30 |

As in Example 1, the following additions had been introduced into the ladle prior to running off the slag:

| | Additions (in kg for 1000 kg of slag) | | | | | |
|---|---|---|---|---|---|---|
| | Bauxite | | | | | |
| Slag N° | From Guinea | Chinese | Alumina | Lime | Silica | Hematite |
| 2 | 985 | — | — | 606 | — | 49 |
| 3 | 1057 | — | — | 432 | — | 48 |
| 4 | — | 998 | — | 664 | 74 | 87 |
| 5 | — | — | 720 | 650 | 100 | 74 |
| 6 | — | — | 867 | 577 | 26 | 74 |
| 7 | — | — | 750 | 612.5 | 20 | 71 |
| 8 | — | — | 874 | 721 | 99 | — |
| 9 | — | — | 805 | 779 | 129 | — |
| 10 | — | — | 819 | 571 | — | 47 |
| 11 | — | — | 685 | 551 | 49 | 68 |
| 12 | — | — | 876 | 554 | 57 | — |

After dissolution of the additions, the insufflation of air and oxygen is stopped and the slags are cooled under the conditions below:

| Slag N° | Type of cooling | Rate of cooling (° C./second) | Final temperature of cooling (° C.) |
|---|---|---|---|
| 2 | Air | 60 | 1200 |
| 3 | Air | 60 | 1200 |
| 4 | Air | 100 | 1200 |
| 5 | Air | 60 | 1200 |
| 6 | Air | 60 | 1200 |
| 7 | Air | 60 | 1200 |
| 8 | Air | 65 | 1200 |
| 9 | Water | 110 | 1200 |
| 10 | Air | 60 | 1200 |
| 11 | Air | 65 | 1200 |
| 12 | Air | 75 | 1200 |

The treated LD scoriae obtained are constituted of 100% of an amorphous vitreous phase.

The scoriae obtained by the treatment are ground at 3500 cm$^2$/g. Mixed with water, the following amounts of heat are released:

| | First peak | | | Second peak | | Heat at |
|---|---|---|---|---|---|---|
| Scoria N° | Intensity (mn) | Time (minutes) | Heat at 15' (J/g) | Intensity (mn) | Time (minutes) | 24 hours (J/g) |
| 2 | 105750 | 10'15 | 80 | — | 65' | 465 |
| 3 | 7370 | 3'30 | 4 | — | — | 70 |
| 4 | 7460 | 2'25 | 4 | 4255 | 132' | 140 |
| 5 | 6770 | 2' | 14 | 38290 | 18' | 415 |
| 6 | 38450 | 27' | 30 | — | — | 265 |
| 7 | 213900 | 5' | 120 | — | — | 440 |
| 8 | 32685 | 8' | 25 | 7425 | 210' | 396 |
| 9 | 103580 | 6' | 73 | — | — | 390 |
| 10 | 420520 | 3' | 125 | — | — | 490 |
| 11 | 61795 | 9' | 45 | — | — | 345 |
| 12 | 10235 | 2' | 10 | — | — | 85 |

The treated scoriae above are used as cement under standardised conditions (W/C=0.5; prismatic test pieces 4 cm×4 cm×16 cm) and the setting time and the resistance to compression (Rc) are determined. The results are given in the table below:

| | Setting time | Resistance to compression R$_c$ (MPa) | | | |
|---|---|---|---|---|---|
| Slag N° | (minutes) | 6 hours | 24 hours | 7 days | 28 days |
| 2 | 5 | 19 | 42 | — | 65 |
| 3 | 120 | — | 1 | 15 | 60 |
| 4 | 240 | 0 | 7 | 17 | 62 |
| 5 | 120 | 17 | 34 | 38 | 42 |
| 6 | — | 0 | 24 | 72 | 98 |
| 7 | 30 | 29 | 54 | 62 | 63 |
| 8 | 30 | 19 | 42 | 60 | 70 |
| 9 | 10 | 22 | 32 | 41 | 43 |
| 10 | 10 | 34 | 38 | 45 | 55 |
| 11 | — | 0 | 17 | 46 | 65 |
| 12 | — | 0 | 2 | 26 | 54 |

The above examples show that the treatment of the invention makes it possible to obtain a treated LD scoria having on its own the characteristics of a binding material.

A sand constituted of half standardised sand and half crushed scoria No.2 added to Portland cement. Starting from this mixture prismatic test pieces are formed under standardised conditions (W/C=0.5; test pieces 4 cm×4 cm×16 cm) and the setting time and the resistance to compression are determined. The results are given below:

| Setting time | Resistance to deformation R$_c$ (MPa) | | | |
|---|---|---|---|---|
| (minutes) | 6 hours | 24 hours | 7 days | 28 days |
| 5 | 8 | 26 | 32 | 55 |

EXAMPLE 3

The steel works slags with the following characteristics are treated by the process of the invention:

| | Chemical composition (% by weight) | | | | | | | | | | |
|---|---|---|---|---|---|---|---|---|---|---|---|
| Slag N° | $SiO_2$ | $Al_2O_3$ | $Fe_2O_3$ | CaO | MgO | $K_2O$ | $Na_2O$ | $SO_3$ | $TiO_2$ | $Mn_2O_3$ | $P_2O_5$ | S |
| 13 | 12.25 | 2.98 | 26.28 | 47.7 | 5.92 | 0.02 | 0.07 | 0.06 | 0.69 | 1.81 | 2.14 | 0.05 |
| 14 | 11.91 | 2.9 | 25.55 | 46.39 | 5.76 | — | — | 0.06 | 0.67 | 1.76 | 2.08 | 0.05 |
| 15 | 11.91 | 2.9 | 25.6 | 46.4 | 5.8 | 0.02 | 0.07 | 0.06 | 0.67 | 1.76 | 2.08 | 0.05 |
| 16 | 12.3 | 2.98 | 26.28 | 47.7 | 5.92 | 0.02 | 0.07 | 0.06 | 0.69 | 1.81 | 2.14 | 0.05 |

| | Mineralogical composition (% by weight) | | | | |
|---|---|---|---|---|---|
| Slag N° | $(C_2S/C_3P)ss$ | C2S | (Fe, Mn, Ca, Mg)O | Ferrite | Free CaO |
| 13 | 7 | 32 | 18 | 33 | 8 |
| 14 | 7 | 31 | 18 | 32 | 4 |
| 15 | 7 | 31 | 10 | 32 | 12 |
| 16 | 7 | 33 | 11 | 33 | 9 |

The steel works slags in the liquid state, run off into a ladle, are mixed and oxidised under the conditions shown below:

| | Treatment | Injected gas | | Duration of |
|---|---|---|---|---|
| Slag N° | temperature (° C.) | Composition | Pressure (Pa) | treatment (minutes) |
| 13 | 1450° C. | Oxygen | $5.10^5$ | 30 |
| 14 | 1450° C. | Air + oxygen (50%) | $5.10^5$ | 30 |
| 15 | 1450° C. | Air + oxygen (50%) | $5.10^5$ | 30 |
| 16 | 1450° C. | Air + oxygen (50%) | $5.10^5$ | 30 |

As in Example 1, the following additives had been introduced into the prior to the run off of the slags:

| | Additions (in Kg for 1000 Kg of slag) | | | | | |
|---|---|---|---|---|---|---|
| | Bauxite | | | | | |
| Slag N° | From Guinea | Chinese | Alumina | Lime | Silica | Hematite |
| 13 | 1057 | — | — | 432 | — | 48 |
| 14 | — | 998 | — | 660 | 74 | 87 |
| 15 | — | — | 720 | 650 | 100 | 74 |
| 16 | — | 513 | — | 238 | 129 | 49 |

After dissolution of the additives, insufflation is stopped and the slags are cooled under the conditions below:

| Slag N° | Type of cooling | Rate of cooling (° C./second) | Final temperature of cooling (° C.) |
|---|---|---|---|
| 13 | Air | 5 | 1200 |
| 14 | Air | 5 | 1200 |
| 15 | Air | 10 | 1200 |
| 16 | Air | 30 | 1200 |

The LD scoriae obtained have the following mineralogical compositions:

| | Mineralogical composition of the scoriae (% by weight) | | | | | | |
|---|---|---|---|---|---|---|---|
| Scoria N° | CA | C2S | C2F | C6AF2 | C2AS | Free CaO | Vitreous phase |
| 13 | 29 | 11 | — | 40 | 20 | — | — |
| 14 | 30 | 12 | — | 34 | 23 | 1 | — |
| 15 | 30 | 20 | — | 35 | 20 | — | — |
| 16 | — | 25 | 20 | 20 | 25 | — | 10 |

The scoriae obtained by the treatment are ground at 3500 $cm^2/g$. Mixed with water, the following amounts of heat are released:

| | First peak | | | Second peak | | Heat at |
|---|---|---|---|---|---|---|
| Scoria N° | Intensity (mn) | Time (minutes) | Heat at 15' (J/g) | Intensity (mn) | Time (minutes) | 24 hours (J/g) |
| 13 | 11370 | 1'50 | 4 | 29120 | 310 | 370 |
| 14 | 10470 | 1'40 | 4 | 11240 | 272 | 310 |
| 15 | 6415 | 3'15 | 9 | 13490 | 86 | 330 |
| 16 | 6000 | 1'15 | 3 | 5130 | 203 | 110 |

The treated scoriae above are used as cement under standardised conditions (W/C=0.5; prismatic test pieces 4 cm×4 cm×16 cm) and the setting time and the resistance to compression (Rc) are determined. The results are given in the table below:

| Scoria N° | Setting time (minutes) | Resistance to compression $R_c$ (MPa) | | | |
|---|---|---|---|---|---|
| | | 6 hours | 24 hours | 7 days | 28 days |
| 13 | 120 | 23 | 75 | 98 | 110 |
| 14 | — | 11 | 60 | 90 | 100 |
| 15 | 90 | 7 | 52 | 69 | 74 |

The above tests show that the treated LD scoriae according to the invention having as mineralogical composition the first or second set of phases exhibit on their own properties of a hydraulic binding material.

In all of the examples the resistances to deformation (Rf) and to compression (Rc) were determined according to the standards NF EN 196-1.

The invention claimed is:

1. A process for the treatment of a steel slag so as to obtain a treated slag comprising a hydraulic binding material, the process consisting essentially of:
    forming a mixed and oxidized liquid steel slag by injecting oxygen or a mixture of gases containing oxygen into a liquid steel slag at a temperature of 1350 to 1550° C., the injection of oxygen or of a mixture of gases containing oxygen being regulated to obtain a pressure of oxygen or a mixture of gases containing oxygen in equilibrium with the liquid steel slag of $10^2$ to $5.10^5$ PA;
    adding to and dissolving in the mixed and oxidized liquid slag a source of alumina and a source of lime and optionally a source of silica and/or iron; and
    cooling the slag until the slag solidifies;
        wherein the quantities of alumina and lime are such that, in the treated steel slag, the proportions of alumina is greater than 25% by weight and the proportion of lime is equal or greater than 40% by weight, the quantities of alumina and lime and optionally of silica and/or iron added, and the rate of cooling are such that the treated slag obtained has a mineralogical composition with one of the following characteristics:
        (a) an amorphous vitreous phase;
        (b) a first set of phases comprising 10–40% by weight CA, 20–50% by weight C2AS, 30–50% by weight C6AF2, and 10–30% by weight C2S;
        (c) a second set of phases comprising 20–40% by weight C2F, 10–30% by weight C2AS, 20–50% by weight C6AF2 and 10–40% by weight C2S; and
        (d) a mixture of an amorphous vitreous phase and of the first or second set of phases.

2. The process according to claim 1, wherein the slag is at a temperature of 1350 to 1500° C.

3. The process according to claim 1, wherein the step of injecting is regulated in order to obtain an oxygen pressure of oxygen or mixture of gases in equilibrium with the liquid slag of $10_5$ to $5×10_5$ Pa.

4. The process according to claim 1, wherein the slag is at a temperature of 1350 to 1500° C., and the step of injecting is regulated in order to obtain an oxygen pressure of oxygen or a mixture of gases in equilibrium with the liquid slag of $10_5$ to $5×10_5$ Pa.

5. The process according to claim 1, wherein the rate of cooling is rapid, and the treated slag obtained is constituted entirely of an amorphous vitreous phase.

6. The process according to claim 1, wherein the rate of cooling is slow, and the treated slag is comprised of the first set of phases or the second set of phases or a mixture of a vitreous phase and the first or second set of phases.

7. The process according to claim 6, wherein the vitreous phase represents 5 to 95% by weight of the treated slag in the mixture.

8. The process according to claim 1, wherein the source of alumina is alumina or bauxite, the source of lime is lime or limestone, the source of silica is silica, and the source of iron is hematite.

9. A treated LD scoria wherein the proportions of alumina and lime represent more than 25% by weight and 40% by weight or more, respectively, of the treated scoria and which possesses a mineralogical composition having one of the following characteristics:
    an amorphous vitreous phase;
    a first set of phases comprising 10–40% by weight CA, 20–50% by weight C2AS, 30–50% by weight C6AF2, and 10–30% by weight C2S;
    a second set of phases comprising 20–40% by weight C2F, 10–30% by weight C2AS, 20–50% by weight C6AF2, and 10–40% by weight C2S; and
    a mixture of an amorphous vitreous phase and of the first or second set of phases.

10. The treated LD scoria according to claim 9, which is comprised entirely by an amorphous vitreous phase.

11. The treated LD scoria according to claim 9, which is comprised by the first set of phases or by the second set of phases.

12. The treated LD scoria according to claim 9, which is comprised by a mixture of a vitreous phase and by the second set of phases.

13. The treated LD scoria according to claim 12, wherein the vitreous phase represents 5 to 95% by weight of the treated LD scoria.

14. The treated LD scoria according to claim 12, wherein the vitreous phase represents 5–15% by weight of the treated scoria.

15. The treated LD scoria according to claim 9, wherein the treated scoria is in the form of a granulate.

16. A material comprising a mixture of a cement and the granulate according to claim 15.

17. The treated LD scoria according to claim 9, wherein the proportion of alumina present in the treated scoria represent at least 30% by weight of the treated scoria.

* * * * *